Figure 8:
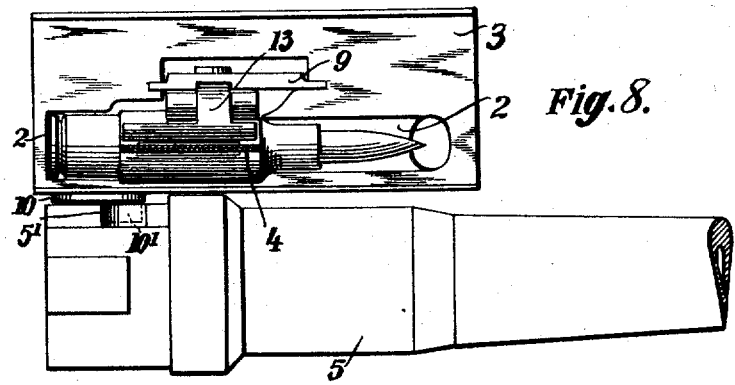

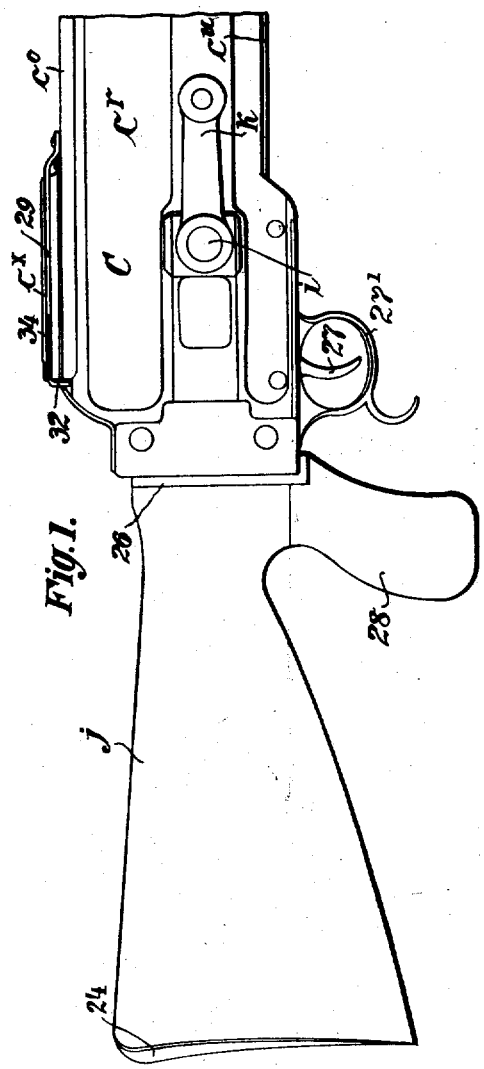

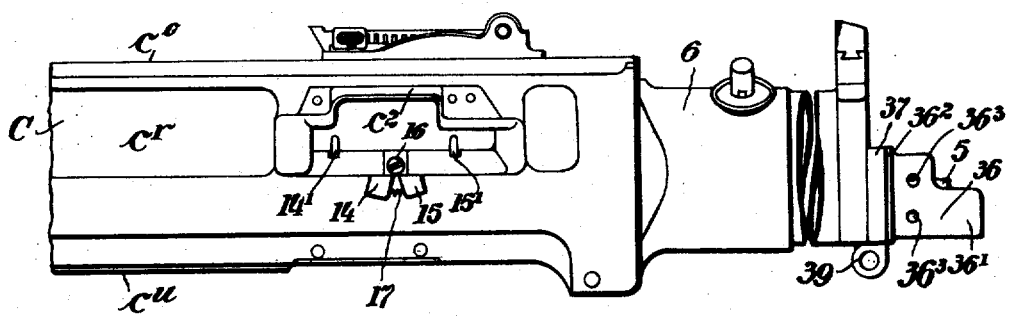
Fig. 1ᵃ.
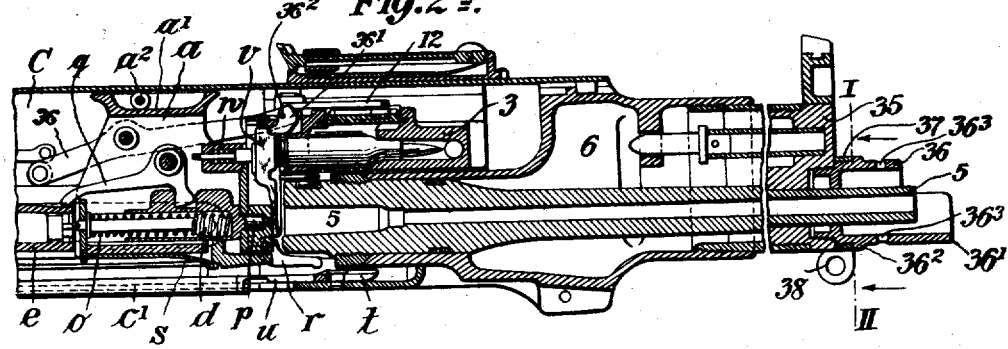
Fig. 2ᵃ.

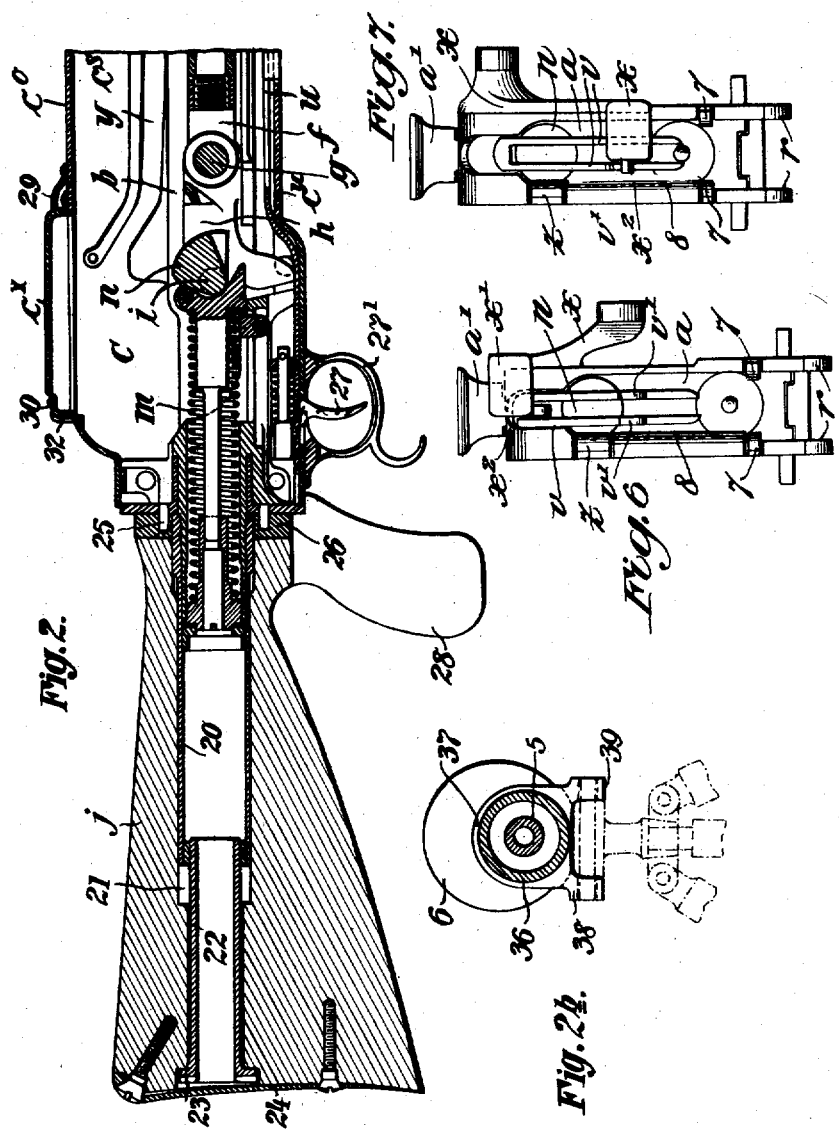

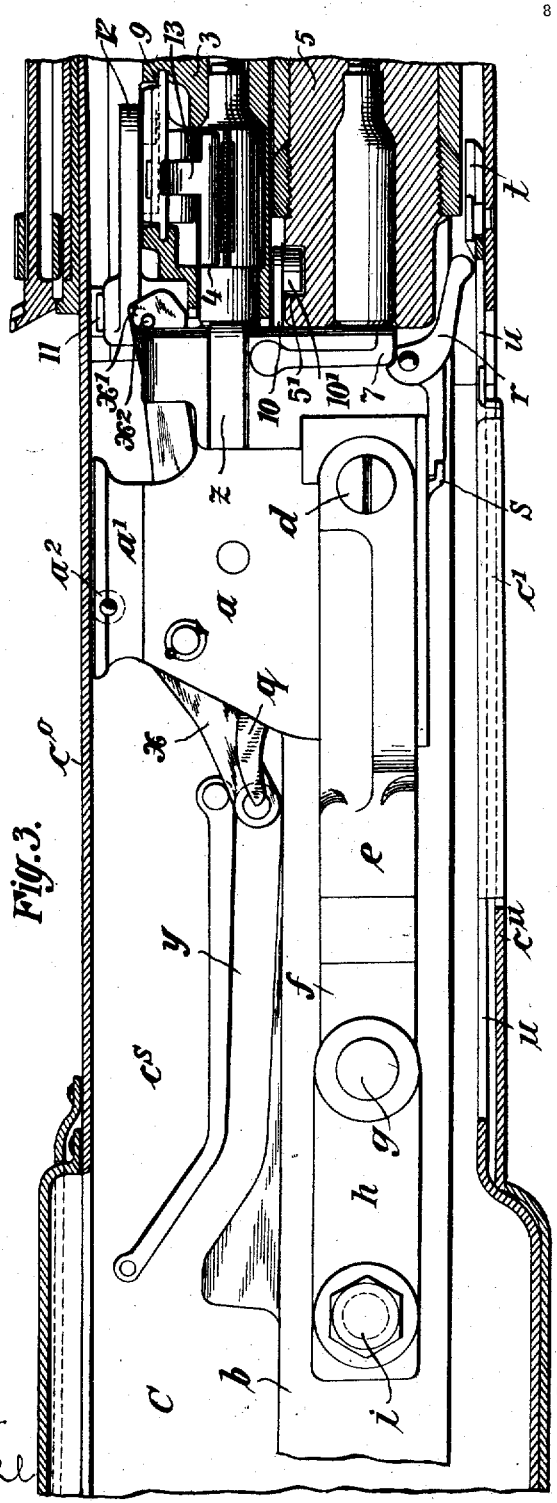

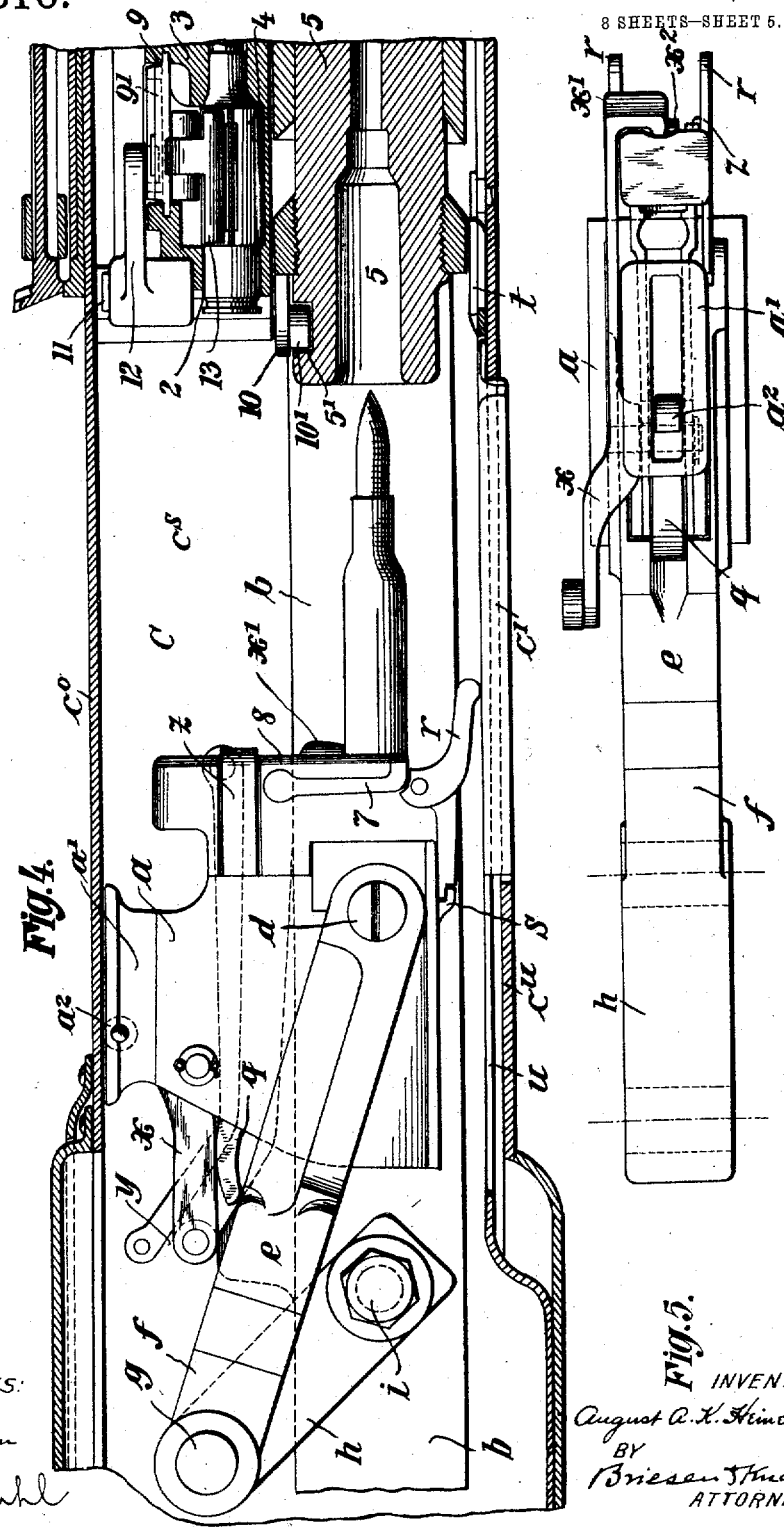

A. A. K. HEINEMANN.
MACHINE GUN.
APPLICATION FILED AUG. 7, 1913.

1,128,310.

Patented Feb. 16, 1915.
8 SHEETS—SHEET 6.

WITNESSES:
G. V. Rasmussen
Henry Ruhl

INVENTOR
August A. K. Heinemann
BY
Briesen & Knauth
ATTORNEYS

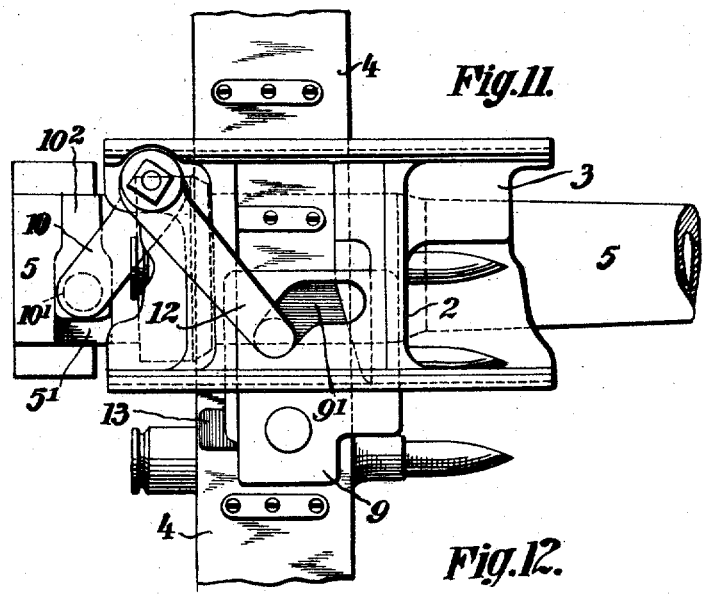
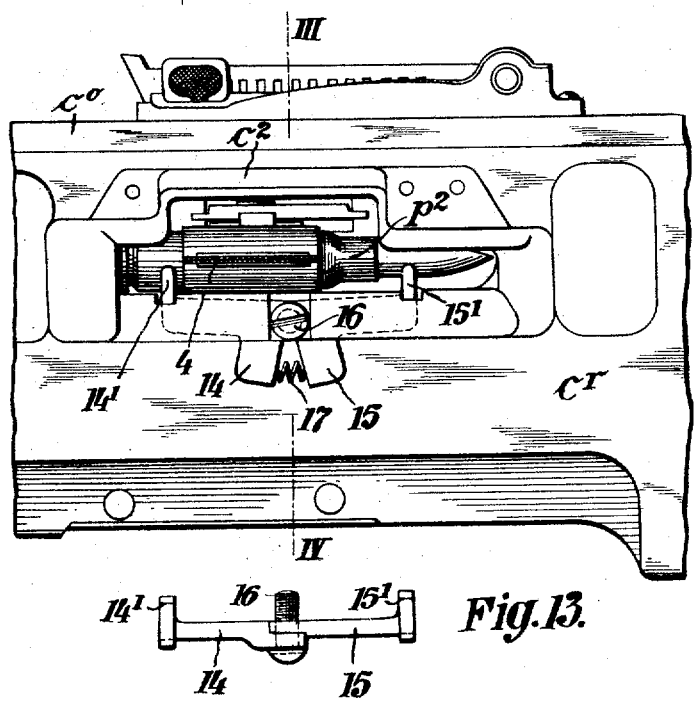

A. A. K. HEINEMANN.
MACHINE GUN.
APPLICATION FILED AUG. 7, 1913.
1,128,310.  Patented Feb. 16, 1915.
8 SHEETS—SHEET 8.
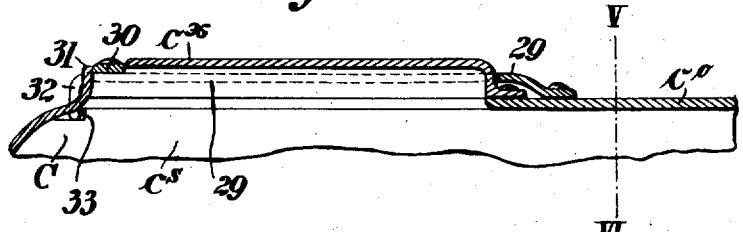
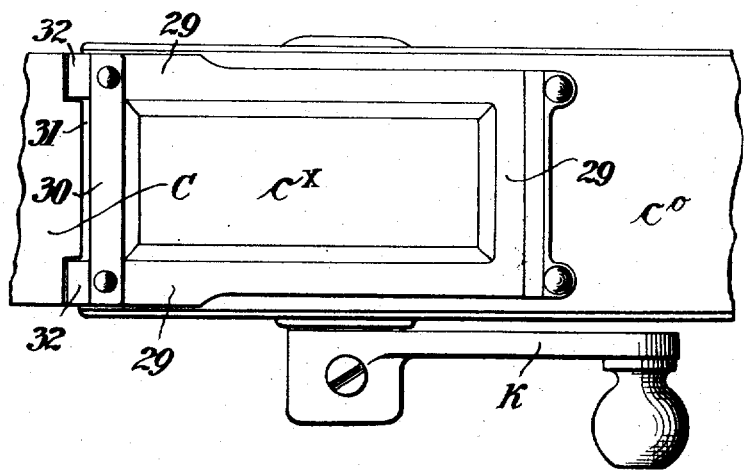
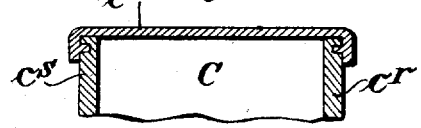
WITNESSES:
INVENTOR
August A. K. Heinemann
BY
Biesen & Knauth
ATTORNEYS

UNITED STATES PATENT OFFICE.

AUGUST ALBERT KARL HEINEMANN, OF BERLIN, GERMANY, ASSIGNOR TO DEUTSCHE WAFFEN- UND MUNITIONSFABRIKEN, OF BERLIN, GERMANY.

MACHINE-GUN.

1,128,310.  Specification of Letters Patent.  Patented Feb. 16, 1915.

Application filed August 7, 1913. Serial No. 783,471.

*To all whom it may concern:*

Be it known that I, AUGUST ALBERT KARL HEINEMANN, a citizen of the German Empire, residing at Berlin, in the German Empire, have invented certain new and useful Improvements in Machine-Guns, of which the following is a specification.

The present invention relates to improvements in machine guns, more particularly in hand machine guns; the improvements refer first, to the arrangement and attachment of the stock; second, to the breech block mechanism; third, to the cartridge feeding mechanism; fourth, to the cover or lid of the receiver of the gun; and fifth, to a muzzle attachment.

The objects of the improvement are first, to provide a stock the end face of which is located in the direction of the axis of the bore of the barrel, so that the recoil pressure will act in a central direction upon the shoulder of the gunner, whereby the steadiness of the gun will be increased during firing; second, to provide a breech block mechanism which is exceedingly simple in construction, of a small weight and efficient in use; third, to provide a cartridge feeding mechanism wherein the length of the stroke of the belt-slide is terminated and made independent of the varying lengths of the recoils of the barrel, so that the feeding stroke of the belt-slide will be in all cases the same; fourth, to provide a cover for the receiver which affords facilities in getting access to the interior thereof; and fifth, to provide a muzzle attachment which is adapted, during firing, to be acted upon in downward direction by the propelling gases leaving the muzzle in order to steady the latter thereby preventing or counteracting the bucking of the muzzle, that is to say, its tendency to jump upward after a shot and diminishing the dispersion of the projectiles. I attain these objects by the means illustrated in the accompanying sheets of drawings.

It is evident that various of the details of construction may be employed in whole or in part, in guns of other types, than that above referred to, and in combination with other mechanism well-known in the art.

In order that my invention may be more fully understood I shall now proceed to describe the same in detail, and for that purpose shall refer to the accompanying drawings, in which similar characters of reference indicate like parts in all the figures, and in which:—

Figure 9:
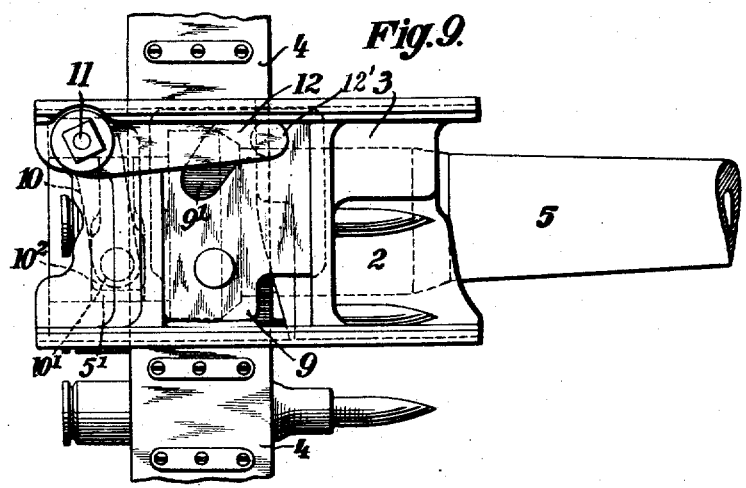

Figure 1 is a side elevation of the rear part, Fig. 1$^a$ a like view of the front part, Fig. 2 a longitudinal section of the rear part, and Fig. 2$^a$ a longitudinal section of the front part of a hand machine-gun according to and embodying the invention; in these figures the lock is in the closed position and the firing pin is uncocked; Fig. 2$^b$ is a section taken on the line I—II in Fig. 2$^a$ as seen in the direction of the arrow; Fig. 3 is an enlarged side elevation of the lock with the cocked firing-pin in the closed position before the firing of a shot, other parts of the gun being shown in section, and Fig. 4 is a like view thereof in the open position after the firing of a shot; Fig. 5 is a top plan view of the lock in the position disclosed by Fig. 3, and Figs. 6 and 7 are end elevations of the lock in the two positions shown in Figs. 3 and 4 respectively; Fig. 8 is a side elevation, Fig. 9 a top plan view and Fig. 10 a rear elevation, showing the cartridge feeding mechanism with the cartridge belt-slide in its inner position, the last view being partly in section taken on the line III—IV in Fig. 12; Fig. 11 is a top plan view showing the cartridge-belt slide in its outer position and the sliding barrel in its extreme rear or recoiled position, Fig. 12 is a side elevation showing the belt-locking device, and Fig. 13 is a top plan view showing the two belt-levers in detail; Fig. 14 is a longitudinal section through the top of the receiver of the machine-gun showing the sliding lid, Fig. 15 is a top plan view thereof, and Fig. 16 is a section taken on the line V—VI in Fig. 14. Figs. 3 to 16 inclusive are drawn on a larger scale than Figs. 1–2$^b$.

Referring to the drawings, the framework or receiver C constituted by the walls $c^o$, $c^u$, $c^r$, $c^s$, has a rear tubular projection which may contain the coil spring $m$. The stock $j$ has a longitudinal perforation 21 and is placed on the said projection 20 and firmly held in position thereon and against the rear plate C' of the receiver C by means of a sleeve-like screw 22 which is inserted from the rear into the perforation 21 and screwed into the end of the projection 20. This tubular screw 22 has at its rear end a flange 23 let into a recess in the butt end of the stock. This recess is covered by the customary butt-plate 24. The stock $j$ is so constructed and formed that when connected to the receiver of the gun, the end face of the butt is located in the direction of the axis of the bore of the barrel. The recoil pressure of the gun will, therefore, act in a central direction upon the shoulder of the gunner. If preferred, the screw 22 may have an internal thread which will engage with an external thread of the projection 20. In order to prevent the stock $j$ turning about the projection 20 the rear plate $C'$ of the receiver C is provided with one or more dowels 25 which enter into holes in an end plate 26 mounted on the front face of the stock.

In the new hand machine-gun the trigger mechanism is actuated by means of a trigger 27 protected by a guard 27′. In order that the hand may have a suitable support or rest when pulling the trigger, a separate handle or grip 28 is mounted on the stock $j$, so that when shooting the hand does not grasp the neck or thin end of the stock, as is usual with muskets, but the grip 28.

The lock (Figs. 2 to 7) of the machine-gun, comprising a box-like casing $a$, is suitably mounted to slide between the walls $b$ in the receiver C and is pivotally connected at $d$ in known manner by means of a forked arm $e$ with the foot $f$. This member $f$ is pivotally connected by means of the pivot $g$ to the arm $h$ fast on the crank-shaft $i$ which carries on its right-hand end projecting out of the receiver C the crank handle $k$. On the shaft $i$ is also mounted the cam $n$ which influences the said spring $m$. The arrangement of these parts is such that for opening the breech or for moving the lock backward, the hand lever $k$ must be rocked back from the front toward the rear and that, when the lock moves backward or opens the toggle-joint constituted by the arm $h$ and the member $f$ together with the forked arm $e$ is tilted upward, as will be understood from Fig. 4.

Mounted in the casing $a$ of the lock is the firing-pin $p$, under the influence of the spring $o$, and its lever $q$, as well as the two-armed, forked trigger-lever $r$ whose rear arm, influenced by a spring $s$, passes in front of the retracted firing-pin and holds it cocked until the lever $r$ is rocked by the stop or shoulder $t$ of the trigger-rod $u$ and released. This lever $q$ is rocked and the firing-pin cocked in known manner by the upward movement of the forked arm $e$, against which the long arm of the lever $q$ bears.

In the front end of the casing $a$ of the lock is inserted a vertically slidable, U-shaped cartridge ejector $v$ which bears at the rear against a resilient abutment $w$ and in front against the hook $x^1$ of a two-armed lever $x$ pivotally connected to the lock casing $a$. The rear free end of this lever $x$ is positively guided in a cam way $y$ in such manner that the front end of the lever $x$ rocks downward when the lock slides backward and upward when the lock slides forward. Mounted on the side of the casing of the lock at the height of the cartridge-bed 2 of the cartridge feeding casing 3 (Figs. 2–4 and 8–10) is a claw $z$ which, when the lock closes, snaps over the edge of the end of the cartridge located in the cartridge feeding casing and, when the lock opens, withdraws from the casing 3 and the cartridge-belt 4 respectively the cartridge clamped between the claw $z$ and the ejector $v$. For withdrawing the case of the discharged cartridge from the barrel 5, which is mounted to slide in known manner in a tubular water-jacket 6, the cartridge-guide 8 in coöperation with one or two spring claws 7 is used; this cartridge-guide 8 is provided on the front of the lock casing $a$ and extends downward from the claw $z$ to the spring or yielding claws 7 supporting the said empty cartridge-case and holding it at the proper lever. If desired, two such guides 8 may be provided one at each side of the lock, so that the cartridge is reliably guided and the cartridge-case positively extracted from the barrel at two opposite points. An outlet $c^1$ for empty cartridge-cases is provided in the bottom of the receiver C.

Supposing the cartridge-belt 4 has been drawn through the casing 3, a cartridge is located in the bed of the latter and the lock, moved forward into its normal or closing position, has seized by means of the claw $z$ the edge of the cartridge which is located in the casing, which cartridge abuts against the resiliently mounted ejector $v$. (Fig. 2ᵃ). If the crank handle $k$ is now turned as far as possible to the rear, the lock is moved backward pulling at the same time the cartridge out of the belt and the casing 3. When the lock slides backward the front end of the lever $x$ is rocked downward at first slowly and then more rapidly by the guide $y$, and the hook $x^1$ pushes the seized cartridge down between the ejector $v$ at the one side and the claw $z$ and guide or guides 8 at the other side until the cartridge is at the same level as the bore of the barrel, in which position the cartridge is stopped and secured by the supporting claws 7 (Figs. 4 and 7). When the cartridge is being pushed down the bottom end of the cartridge holds the spring supported ejector $v$ (Figs. 6, 7) in horizontal direction so far back in the casing of the lock that the recess $v^1$ of the ejector is out of the path of the pin $x^2$ of the hook $x^1$, and consequently when the hook $x^1$ moves downward this pin cannot engage in the recess $v^1$. When the lock moves forward again, (Fig. 4), it pushes the cartridge held by it into the barrel in known manner and pushes the barrel forward into the shooting position.

During the forward motion of the lock the hook $x^1$ of the lever $x$ rocks back into its upper end position. When the lock reaches its closing position, the claw $z$ seizes the end of the new cartridge in the feed casing, and this cartridge simultaneously holds the ejector in its rear position. A cartridge is then located in the barrel, the cartridge in the feed casing is grasped by the lock and the firing-pin is cocked (Fig. 3). The machine-gun is thus loaded and ready for being fired and can be employed in known manner for firing single shots or a number in succession. After firing a shot the rearwardly sliding lock withdraws the new cartridge out of the casing 3, and when separating from the likewise recoiling barrel also the empty cartridge-case out of the barrel as pointed out above. The hook $x^1$ which rocks downward again pushes this new cartridge downward level with the barrel, whereby the empty cartridge case underneath and in the path of the downward moving new cartridge is forced downward between the supporting spring claws 7, and after having passed the latter is ejected through the opening $c^1$ in the bottom $c^u$ of the receiver C. When all the cartridge supply ceases the lock sliding rearwardly after the last shot does not draw a new cartridge out of the casing, but only draws the last empty cartridge-case out of the barrel. The ejector $v$ owing to the non-supply of a new cartridge is then no longer held back in the casing of the lock, but is by the action of its resilient support in its outer or forward position of rest, so that the downward rocking hook $x^1$ engages with its pin $x^2$ in the recess $v^1$ of the ejector $v$ in order to jerk the latter downward. The lower ends of the fork-shaped ejector $v$ are striking thereby against the empty cartridge-case supported by the spring claws 7 and throw it downward between the latter and through the outlet $c^1$. When the lock then again slides forward the hook $x^1$ of the lever $x$ rocking upward again, lifts the ejector $v$ and returns it into its upper end position.

The casing $a$ of the lock, guided by the guides $b$ in the customary manner, is provided above with a box $a^1$ (Figs. 2ª to 5) which is open at the top. In this box is journaled a guide roller $a^2$ which runs along the top $c^o$ of the receiver C when the lock slides forward and backward. In this manner the lock is positively and reliably guided with very little friction.

The cartridge feeding mechanism arranged in front of the lock (Figs. 2ª and 8 to 11) above the sliding barrel 5 and the rear end of the water-jacket 6 consists of a flat casing 3 having a transverse aperture through which the cartridge-belt 4 passes. As seen from the rear, the right-hand portion of this transverse aperture has the form of a cartridge bed 2 for receiving the new cartridge supplied whenever the belt is fed forward in the direction of the arrow shown in Figs. 9–11. The left-hand portion 1 of the aperture is only so large that the belt emptied of cartridges can conveniently pass through it. The belt-slide or pusher 9 is located in the casing 3 above the said transverse aperture and is shifted when the barrel slides. For this purpose a vertical crank-shaft 11 (Figs. 8–11) is mounted in the casing 3, and a pin $10^1$ of its lower crank-arm 10 engages in a slide $10^2$ displaceable in the transverse recess $5^1$ in the barrel, while a pin $12^1$ of its upper crank-arm 12 engages in an annular slot or groove $9^1$, $9^2$ in the belt-slide 9. The part $9^1$ of the slot which effects the displacement of the belt-slide is parallel to the axis of the barrel, while the non-effective part $9^2$ of the said slot runs parallel to the circle described by the crank pin $12^1$. This slide 9 is provided at its right-hand end with a spring-influenced feed-lever 13. Below the inlet $c^3$ (Fig. 10) for the cartridge-belt 4 containing the cartridges $p^1$, $p^2$, $p^3$ . . . which inlet is provided in the right-hand wall $c^r$ of the receiver C and is roofed over by a roof $c^2$ (Figs. 1ª, 10, 12, 13) is located in the right-hand wall $c^r$ of the receiver a pivot 16, about which two bell-crank belt-levers 14 and 15 are rockable. The ends of the downwardly-directed arms of these two levers are formed as grips, while the ends of the horizontal arms are provided with upwardly-directed lugs or projections 14' and 15', respectively. A spring 17 inserted between the levers tends to hold the lower arms spread apart. In this position of the levers the lugs 14' and 15' are in their upper locking position and project into the space between two cartridges, e. g. between the cartridges $p^2$ and $p^3$ (Fig. 10); as seen from the rear the one lug is located in front of and the other in the rear of the cartridge-belt 4. In this position the belt-levers act as stops for the cartridges.

After firing a shot the lock $a$ and the barrel 5 slide at first backward together, whereupon they separate in well-known manner and the barrel comes to a standstill. By the recoil of the barrel the crank-shaft 11 is rocked by means of the arm 10, whereas the arm 12 pushes the belt-slide outward. When the pin $12^1$ has passed the length of the effective part $9^1$ of the slot the outward movement of the belt-slide 9 ceases. At this time the parts are in the position shown by dotted lines in Figs. 10 and 11. The spring-influenced lever 13 of the slide 9 has passed over and engaged the next cartridge $p^2$, while the lock $a$ which in the meantime has separated from the barrel 5 slides farther backward and withdraws the preceding cartridge $p^1$ out of the cartridge-feeder and the belt 4 in known manner. While the lever 13 slides over the cartridge $p^2$ the latter bears against the lugs 14′, 15′ of the bell-crank belt-levers 14 and 15 (Figs. 10 and 12), which prevent the cartridge $p^2$ and the cartridge-belt 4 from shifting to the right.

Figure 10:
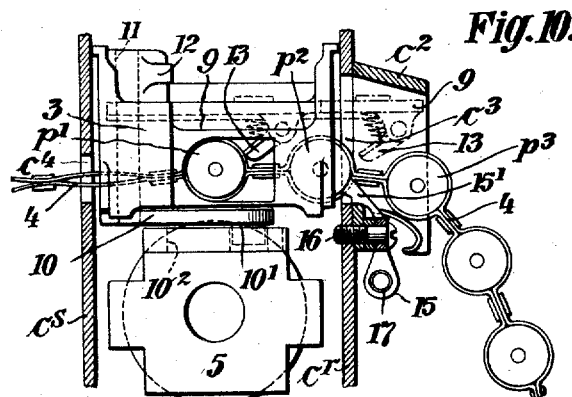

At the termination of the outward motion of the belt-slide 9 the recoil of the barrel 5 should also terminate. As the length of the recoil of the barrel is not always the same but varies in some limits, so it may happen that the recoiling barrel acts too long upon the belt-crank device 10, 11, 12, whereby the belt-slide 9 would be pushed outward too great a distance, so that its lever 13 may perhaps engage the second subsequent cartridge $p^3$ (Fig. 10). To prevent such occurrence which would bring the whole gun out of function, and to obtain in all events a certain predetermined length of outward movement of the belt-slide in spite of the varying length of the recoil of the barrel the effective slot $9^1$ in the belt-slide 9 is provided with a non-effective part $9^2$ in such a manner that during the last part of the rearward rotation of the crank 10, 11, 12, and consequently also during the first part of its forward rotation, this crank leaves the belt-slide uninfluenced, so that when the latter has reached its required extreme outer position, the barrel can slide back still farther and rotate the crank arms 10, 12 from the position shown by dotted lines in Fig. 11 into the position shown by full lines in the same figure, without acting on the belt-slide. If the barrel is pushed forward by closing the lock the crank 10, 11, 12, will be rotated in forward direction but it does not act upon the belt-slide as long as the crank pin $12^1$ is moving in the part $9^2$ of the slot, but when the crank pin $12^1$ enters into the effective part $9^1$ of the slot the forward rotation of the crank device will cause the inward movement of the belt-slide. During this inward movement the feed-lever 13 drives the seized cartridge $p^2$ and the cartridge-belt with it and brings the cartridge into the cartridge-bed 2 of the casing 3 in which the cartridge $p^1$ was previously located. The part of the belt emptied of cartridges slides a corresponding distance through the outlet $c^4$ (Fig. 10) in the left-hand side wall $c^s$ of the receiver C.

If it is desired to withdraw the cartridge-belt to the right, it is only necessary to press together the lower arms of the belt-levers 14 and 15 against the action of the spring 17. The upper ends or lugs 14′, 15′ of these levers are thereby rocked downward and the lugs 14′ and 15′ thus removed out of the path of the cartridges, so that the belt can be unimpededly withdrawn toward the right. The lugs 14′, 15′ are beveled on their outer sides, so that the cartridges when pushed forward, that is to say, inward by the feeder-lever can readily slide over them.

The side walls $c^r$, $c^s$ (Figs. 14–16) of the receiver C carry the cover or lid $c^0$ which is pushed on from the front and guided in suitable grooved guides (Fig. 16). This sliding lid is held in its closed position by a locking device arranged as follows. On the lid $c^0$ is mounted a U-shaped member 29 whose elastic limbs are connected together by a cross-bar 30. The frame thus formed surrounds a bulged portion $c^x$ of the lid. In the closed position of the lid the bar 30 bears against a bent-up portion 31 of the rear wall of the receiver which serves as a stop and limits the closing movement of the lid. The free ends of the limbs of the member 29 are formed as hooks 32, and when the lid is in its closed position they engage behind suitable stops 33 provided on the wall 31. The sliding lid is then fixed in both directions of movement. For opening the lid $c^0$, by lifting the frame 29, 30 the hooks 32 are first released from the stops 33, whereupon the lid is slid forward in its guides. For more conveniently grasping and holding the member 29 the outer edges of its limbs are roughened or checkered at 34 (Fig. 1). The sliding lid is closed in the reverse manner.

It is well known that hinged lids which are usually used for closing the receiver of machine guns, have a good many drawbacks, and also sliding lids constructed and arranged to be opened by sliding the lid rearward show the disadvantage that such a sliding lid in its opened position will be obstructive, impede the gunner and sag or get out of shape as the free end of such a sliding lid can not be supported in the required manner. These disadvantages are obviated by forming the cover of the receiver as a sliding lid which in accordance with the present improvement is adapted to be opened by pushing it longitudinally toward the front. As the improved sliding lid in its open position is located fairly close over the water jacket, there is always sufficient room for opening and supporting it in such opened position by suitable means, shoulders or the like attached to the water jacket. Moreover in its opened position my improved sliding lid forms no obstruction for the work of the gunner or to be done in the receiver. Into the front wall 35 of the water-jacket 6 of the hand machine gun is screwed a sleeve-like structure 36 which surrounds the muzzle of the barrel 5 and is provided beneath the muzzle with a troughshaped projection $36^1$.

The sleeve 36 may be provided in its upper part, if desired with perforations $36^3$, constituting outlets or passages for the propelling gases leaving the barrel. Upon the recessed front end of the sleeve is mounted a ring 37. After the sleeve has been screwed into position in the wall 35 this ring is located between this wall and a collar 36² on the sleeve 36. The ring has two lateral or more properly downward directed eyelets 38, 39 by means of which it may be pivotally fastened on a three-legged rest or the like as shown by dotted lines in Fig. 2ᵇ, or on a suitable arm or support extending from a gun-carriage not shown.

When firing a shot the driving gases issuing from the bore of the barrel can freely escape upward, whereas in downward direction they are striking against the projection 36¹ forming and acting somewhat like a baffle-plate to cause the said gases to exert a downward pressure upon the muzzle attachment. Owing to this downward pressure the muzzle of the hand machine gun, when firing a shot, will be prevented from bucking or is held down, when supported, on its rest, carriage or the like, whereby the dispersion of projectiles is greatly reduced.

I claim:—

1. In a hand machine-gun, the combination of a receiver having an outlet in the bottom thereof, a barrel having its breech end mounted in the receiver, a lock slidable longitudinally in the receiver, for closing the breech, a cartridge-feeder fixed in the receiver above the breech end of the barrel, said lock having a vertical guide extending from the cartridge-feeder down to the breech, means on the lock for seizing a cartridge located in the cartridge-feeder, holding the same at the top of said guide, and withdrawing the same from the feeder when the lock moves backward, means on the lock for seizing an empty cartridge-case located in the barrel, holding the same at the bottom of said guide and withdrawing the same from the barrel when the lock moves backward, and a two-armed lever fulcrumed in the lock, the one end of said lever being positively guided in the receiver, and the other end being adapted to drive downward in said guide a cartridge withdrawn by said former means and thereby to eject through said outlet the cartridge-case withdrawn by the latter means.

2. In a hand machine-gun, the combination of a receiver having an outlet in the bottom thereof, a barrel having its breech end mounted in the receiver, a lock slidable longitudinally in the receiver for closing the breech, a cartridge-feeder fixed in the receiver above the breech end of the barrel, said lock having a vertical guide extending from the cartridge-feeder down to the breech, an ejector slidable vertically in said guide, means on the lock for seizing a cartridge located in the cartridge-feeder, holding the same at the top of said guide, and withdrawing the same from the feeder when the lock moves backward, means on the lock for seizing an empty cartridge-case located in the barrel, holding the same at the bottom of said guide and withdrawing the same from the barrel when the lock moves backward, and a two-armed lever fulcrumed in the lock, the one end of said lever being positively guided in the receiver, and the other end being adapted to drive said ejector downward in said guide and thereby to eject through said outlet the cartridge-case withdrawn by the latter means.

3. In a hand machine-gun, the combination of a receiver having an outlet in the bottom thereof, a barrel having its breech end mounted in the receiver, a lock slidable longitudinally in the receiver for closing the breech, a cartridge-feeder fixed in the receiver above the breech end of the barrel, said lock having a vertical guide extending from the cartridge-feeder down to the breech, an ejector having a recess in the front face thereof slidable vertically in said guide, means on the lock for seizing a cartridge located in the cartridge-feeder, holding the same at the top of said guide, and withdrawing the same from the feeder when the lock moves backward, means on the lock for seizing an empty cartridge-case located in the barrel, holding the same at the bottom of said guide and withdrawing the same from the barrel when the lock moves backward, and a two-armed lever fulcrumed in the lock, the one end of said lever being positively guided in the receiver, and the other end being hooked and carrying a pin adapted to engage in said recess and drive said ejector down and up in said guide.

4. In a hand machine-gun, the combination of a receiver having an outlet in the bottom thereof, a barrel having its breech end mounted in the receiver, a lock slidable longitudinally in the receiver for closing the breech, a cartridge-feeder fixed in the receiver above the breech end of the barrel, said lock having a vertical guide extending from the cartridge-feeder down to the breech, a U-shaped ejector slidable vertically in said guide, a spring tending to press the ejector to the front of said guide, means on the lock for seizing a cartridge located in the cartridge-feeder, holding the same at the top of said guide, and withdrawing the same from the feeder when the lock moves backward, means on the lock for seizing an empty cartridge-case located in the barrel, holding the same at the bottom of said guide and withdrawing the same from the barrel when the lock moves backward, and a two-armed lever fulcrumed in the lock, the one end of said lever being positively guided in the receiver, and the other end being adapted to drive said ejector downward in said guide.

5. In a hand machine-gun, the combination of a receiver, a barrel attached thereto, a stock attached in alinement with the barrel to the rear wall of the receiver, a lock guided laterally in the receiver, and a guide roller mounted on the top of the lock and guided by the top of the receiver.

6. In a machine gun, the combination of a barrel, a cartridge feeder, a lock movable to an open and closed position, means on said lock for withdrawing a cartridge from the cartridge feeder, means on said lock for withdrawing a cartridge case from the barrel, a guide carried by said lock, a lever pivotally connected with said lock and adapted to move therewith, said lever being arranged to move the withdrawn cartridge downwardly in said guide into alinement with the barrel and to cause the said cartridge to expel the withdrawn cartridge case, an ejector held in an inoperative position by each succeeding cartridge, and arranged to move into the path of the pivoted lever after the last cartridge has been withdrawn from the feeder whereby said lever will actuate said ejector to expel the final cartridge case and means for operating said lever.

7. In a machine gun, the combination of a barrel, a cartridge feeder, a lock movable to an open and closed position, means on said lock for withdrawing a cartridge from the cartridge feeder, means on said lock for withdrawing a cartridge case from the barrel, a guide carried by said lock, a lever pivotally connected with said lock and adapted to move therewith, said lever being arranged to move the withdrawn cartridge downwardly in said guide into alinement with the barrel, a spring controlled bow-shaped ejector adapted to be horizontally moved against the tension of its spring toward the rear to an inoperative position, said spring being arranged to move said ejector in a reverse direction into the path of said lever and means for operating said lever.

8. In a machine gun, the combination of a barrel, a cartridge feeder, a lock movable to an open and closed position, means on said lock for withdrawing a cartridge from the cartridge feeder, means on said lock for withdrawing a cartridge case from the barrel, a guide carried by said lock, a lever pivotally connected with said lock and adapted to move therewith, said lever being arranged to move the withdrawn cartridge downwardly in said guide into alinement with the barrel, an ejector movable into the path of said pivoted lever and provided with a notch, a pin on said lever adapted to enter said notch whereby said ejector is actuated in the expelling direction during one movement of said lever, a hook-like projection on said lever adapted to engage said ejector whereby the latter is actuated in a reverse direction during an opposite movement of said lever and means for operating said lever.

9. In a machine gun, a receiver, an upright projection thereon, a slidable cover for said receiver, a resilient member carried by said cover and adapted to engage said projection whereby a closing movement of said cover is arrested, and means carried by said member adapted to engage said receiver for locking said cover in its closed position.

10. In a machine gun, a receiver, a slidable cover therefor, means carried by said cover and adapted to engage said receiver for locking said cover in its closed position and means on said receiver for engaging said locking means whereby a closing movement of said cover is arrested.

11. In a machine gun, a receiver, a movable cover therefor provided with an outwardly bulged portion, a movable member surrounding said portion and projections carried by said member and arranged to engage said receiver whereby said cover is locked in its closed position.

12. In a machine gun, a receiver, a movable cover therefor provided with an outwardly bulged portion, resilient members on opposite sides of said portion, a cross-bar connecting said members, a projection on said receiver adapted to engage said cross-bar whereby a closing movement of said cover is arrested and coöperating means on said receiver and cover respectively for locking the latter in its closed position.

13. In a machine gun, a receiver, a movable cover therefor provided with an outwardly bulged portion, resilient members on opposite sides of said portion, a cross-bar connecting said members, a projection on said receiver adapted to engage said cross-bar whereby a closing movement of said cover is arrested, a hook carried by each member and stops located on said receiver and adapted to be engaged by said hooks whereby said cover is locked in its closed position.

AUGUST ALBERT KARL HEINEMANN.

Witnesses:
WOLDEMAR HAUPT,
HENRY HASPER.

Copies of this patent may be obtained for five cents each, by addressing the "Commissioner of Patents, Washington, D. C."